United States Patent
Hannigan et al.

(10) Patent No.: US 7,080,381 B2
(45) Date of Patent: Jul. 18, 2006

(54) MESSAGE BRIDGING SYSTEM AND METHOD FOR SINGULAR SERVER TO SINGULAR OR MULTIPLE EVENT RECEPTION ENGINES

(75) Inventors: Kenneth Eugene Hannigan, Tucson, AZ (US); Glen Hattrup, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 09/870,563

(22) Filed: May 31, 2001

(65) Prior Publication Data

US 2002/0184408 A1 Dec. 5, 2002

(51) Int. Cl.
*G06F 3/00* (2006.01)
(52) U.S. Cl. ......................... 719/313; 719/318; 714/26
(58) Field of Classification Search ................ 719/313, 719/318, 328; 714/25, 26
See application file for complete search history.

(56) References Cited

U.S. PATENT DOCUMENTS

| 5,175,684 A | 12/1992 | Chong ........................ 364/419 |
| 5,805,896 A | 9/1998 | Burgess ....................... 395/710 |
| 5,974,563 A | 10/1999 | Beeler, Jr. ....................... 714/5 |
| 6,026,500 A * | 2/2000 | Topff et al. .................... 714/26 |
| 6,092,102 A * | 7/2000 | Wagner ....................... 340/7.29 |
| 6,094,684 A | 7/2000 | Pallmann ..................... 709/227 |
| 6,549,956 B1 * | 4/2003 | Bass et al. .................. 719/328 |
| 6,718,332 B1 * | 4/2004 | Sitaraman et al. .......... 707/102 |
| 6,718,376 B1 * | 4/2004 | Chu et al. .................... 709/223 |

FOREIGN PATENT DOCUMENTS

| EP | 0 864 990 A2 | 9/1998 |
| GB | 2 335 060 A | 9/1999 |

OTHER PUBLICATIONS

IBM DOSSIER #AUS919990324.
IBM DOSSIER #JP919970701.
IBM DOSSIER #AUS919970363.

* cited by examiner

*Primary Examiner*—Thomas Lee
*Assistant Examiner*—Li Zhen
(74) *Attorney, Agent, or Firm*—Dale F. Regelman; Allen K. Bates

(57) ABSTRACT

The present invention provides a system and method for facilitating communications between different systems requiring different event message techniques. In one embodiment, a method for bridging messages between a first and at least a second application having differing message formats comprises receiving message data from the adapter of a first application in a first format, translating and/or parsing the received message data into at least a second format and outputting the translated and/or parsed message data to at least the second application.

22 Claims, 6 Drawing Sheets

```
typedef struct
{
    uchar   year;           /* Years since BASE_YEAR (0-255) */
    uchar   mon;            /* Month (1 - 12)                */
    uchar   day;            /* Day (1 - 31)                  */
    uchar   hour;           /* Hour (0 - 23)                 */
    uchar   min;            /* Minutes (0 - 59)              */
    uchar   sec;            /* Seconds (0 - 59)              */
} DateTime;

typedef struct evRdata
{
    int32   eventNum;       /* the event number.                       */
    int16   sevCode;        /* event severity.                         */
    int16   applType;       /* application type (hsm, api, etc)        */
    int32   sessId;         /* session number                          */
    int32   version;        /* version number of this structure (2)    */
    int32   eventType;      /* event type
                             * (ADSM_CLIENT_EVENT, ADSM_SERVER_EVENT)  */
    DateTime timeStamp;                             /* timestamp for event data.           */
    uchar   serverName[MAX_SERVERNAME_LENGTH+1];    /* server name                         */
    uchar   nodeName[MAX_NODE_LENGTH+1];            /* Node name for session               */
    uchar   commMethod[MAX_COMMNAME_LENGTH+1];      /* communication method                */
    uchar   ownerName[MAX_OWNER_LENGTH+1];          /* owner                               */
    uchar   hlAddress[MAX_HL_ADDRESS+1];            /* high-level address                  */
    uchar   llAddress[MAX_LL_ADDRESS+1];            /* low-level address                   */
    uchar   schedName[MAX_SCHED_LENGTH+1];          /* schedule name if applicable         */
    uchar   domainName[MAX_DOMAIN_LENGTH+1];        /* domain name for node                */
    uchar   event[MAX_MSGTEXT_LENGTH];              /* event text                          */
    int16   reserved1;                              /* reserved field 1                    */
    int16   reserved2;                              /* reserved field 2                    */
    uchar   reserved3[1400];                        /* reserved field 3                    */
} eleventRecvData;
```

FIG. 4

| Data Provided by TSM | Data Expected by TEC | Substitutions | Notes |
|---|---|---|---|
| | eventClass | dynamically selected string | not defined by TSM structure |
| | source | generic string | not defined by TSM structure |
| | sub_source | generic string | not defined by TSM structure |
| hlAddress[MAX_HL_ADDRESS+1]; | origin | | |
| serverName[MAX_SERVERNAME_LENGTH+1]; | sub_origin | | |
| | adapter_host | generic string | not defined by TSM structure |
| | hostname | generic string | not defined by TSM structure |
| timeStamp; | date | | requires formatting changes |
| sevCode; | severity | | requires formatting changes |
| domainName[MAX_DOMAIN_LENGTH+1]; | policy_domain | | |
| schedName[MAX_SCHED_LENGTH+1]; | schedule_domain | | |
| sessId; | session_id | | |
| commMethod[MAX_COMMNAME_LENGTH+1]; | comm_method | | |
| ownerName[MAX_OWNER_LENGTH+1]; | owner_name | | |
| event[MAX_MSGTEXT_LENGTH]; | msg | | |
| eventNum; | msg_index | | |
| eventNum; | tsm_message_number | | |
| sevCode; | tsm_message_severity | | |
| | tsm_server_platform | | not defined by TSM structure |
| applType; | | | used in determining eventClass |
| version; | | | not used |
| eventType; | | | used in determining eventClass |
| nodeName[MAX_NODE_LENGTH+1]; | | | not used |
| llAddress[MAX_LL_ADDRESS+1]; | | | not used |
| reserved1; | | | not available for use |
| reserved2; | | | not available for use |
| reserved3[1400]; | | | not available for use |

FIG. 6

MESSAGE BRIDGING SYSTEM AND METHOD FOR SINGULAR SERVER TO SINGULAR OR MULTIPLE EVENT RECEPTION ENGINES

BACKGROUND OF THE INVENTION

The present invention relates generally to software products for message bridging, and more specifically, to a system and method for integrating software products having different event message input and output formats.

During the course of day-to-day business transactions within enterprises, e.g., credit card companies, brokerage houses, and airlines, immense amounts of data are continually recorded. Such entities typically employ enterprise computing, wherein an enterprise may comprise a large number of computers of varying type (e.g. mainframes, minicomputers, microcomputers and workstations), with multiple hosts, running on multiple platforms of varying type. This may be due to internal or external reorganizations or mergers of various entities or departments, each with different computing needs, and thus, a variety of hardware and software to fulfill those needs. On a computer scale, enterprises may be as dynamic as the human population.

One exemplary enterprise component is a storage manager. In an enterprise, ongoing backup of enterprise-wide data must be continuously performed, so that, in the event the machine storing the original copy of the data fails or is inaccessible, a backup copy of the data may be retrieved. One exemplary archival system for making and restoring such backups is the Tivoli™ Storage Manager (TSM). Such an archival system may provide a guarantee for enterprises that their valuable data, which is often an enterprise's largest asset, or software, may be restored from an archive in the event the original data becomes unavailable.

To manage, monitor and/or control the activities of the various enterprise components, an enterprise console, e.g. Tivoli™ Enterprise Console (T/EC) is employed. The enterprise console uses a plurality of agents or "spies" to gather information about the activities of the various enterprise components. Such information is sent to the enterprise console when problems or faults occur. The enterprise console provides this information to an administrator or an information technology resource manager at a central location, so that he or she may efficiently deploy information technology or consulting services. For example, if a system in a particular department crashes, the administrator can send a consultant to that department immediately to resolve the problem. As another example, if a machine runs out of space, the administrator, on the fly, can allocate some more space for that machine. The enterprise console thus allows the administrator to remain in one physical location to stay apprised of events taking place within the enterprise at any number of physical locations.

Within a single enterprise, the enterprise console and various enterprise components have often been developed independently of one another and, additionally, may be mature products. For example, the T/EC and TSM were both developed independently by different developers working for different companies and have each undergone a number of revisions. Today, the T/EC and TSM are owned and supported by the same company due to corporate acquisitions, yet there is no standard for exchanging event messages between the two products. Beyond this specific example, similar situations exist with respect to software and hardware components within many enterprises as well as outside the enterprise context.

As among such various components, each component, e.g., a backup archive product, an enterprise control, a database application, and a web host, has different requirements and needs for sending and receiving event messages to and from other components. Additionally, each component may have different formats for the event messages it is able to send and receive, without any single standard in existence.

Therefore, a translation means must be employed for allowing various components to communicate effectively with one another. One translation method known in the art is the use of a dedicated hardware device for receiving, translating, and sending event messages, e.g., between a Unix machine and a mainframe, between Unix and a Windows NT™ machine, between a mainframe and a Windows NT™ machine, or other translations between operating systems. However, many such hardware devices are unable to translate event messages between two different types of software, since what needs to be translated is how the information is presented, (e.g., how the information is ordered in ASCII), and not how the information is stored, (e.g., as binary data).

In the networking field, translations are routinely performed, at various levels within layers of a communication protocol, e.g., as between various layers of TCP/IP, or between a TCP/IP layer and a NetBEUI. layer. However, translations are not performed at the application-to-application layer in this context.

Sending messages from an enterprise storage management product to an enterprise event receiver has previously been problematic. Known solutions include the use of logfile adapters or reverse engineering of the API for the event receiver. Use of a logfile adapter is disadvantageous, as it presents issues with scalability (number of processable messages) and resource issues, and a priori knowledge of the messages is required. Reverse engineering the API is disadvantageous, as it presents synchronization and resource issues, since every time the API is updated, all of the reverse engineering effort must be done again. There also is no guarantee that the reverse engineering efforts will be successful after the API has been modified.

SUMMARY OF THE INVENTION

The present invention provides a software-based system and method for facilitating communications between different software systems requiring different event message techniques and/or formats by building the receiver's message format into the sending software application. For example, as between T/EC and TSM, TSM possesses a specific component that handles sending messages to the T/EC. Yet, the entire application programming interface (API) of the T/EC has not been integrated with the TSM. As a result, in the event the API of the T/EC changes, the messages being sent by the TSM are locked into a specific format, such that the T/EC may not be able to correctly receive those messages. However, the TSM is able to send out an event-specific, generic TSM message to a plug-in module that loads into a server, typically referred to as a userexit. In a system consistent with the present invention, the userexit (or other generic adapter) is loaded with a user-defined software module that has knowledge of the format of events the server is capable of sending out, as well as the format of events the receiver expects to receive. So long as the messages sent and received maintain the same structure, a system consistent with the invention can translate them, thereby allowing messages that do not currently exist to be translatable, once they are created.

It should be recognized that the invention has utility in a wide variety of contexts and is not limited to TSM and T/EC or future releases thereof. The method of the invention allows a software product to communicate with another software product, simply by modifying a very small module having code that is relatively fast to develop, debug and test (due to the limited number of lines of code required to be written and/or modified), thereby providing integration with other software products, including components of an enterprise and other systems involving established, mature, or older software products that are otherwise incompatible with one another.

Specifically, in the context of TSM and T/EC interoperability, the problems associated with the use of a logfile adapter are resolved by the invention, which does not require a prior knowledge of the messages and can send messages to multiple event receivers. The problems associated with reverse engineering are resolved by the invention, which utilizes the API provided with the event receiver engine.

In one embodiment, a method for bridging messages between a first and at least a second application having differing message formats comprises receiving message data from the adapter of a first application in a first format; translating and/or parsing the received message data into at least a second format; and outputting the translated and/or parsed message data to at least the second application.

In another embodiment, a computer system consistent with the invention comprises a first application, at least a second application, and a message bridge. The first application has an adapter capable of outputting message data in a first format. The second application is capable of receiving message data in a second format. The message bridge is adapted to receive message data from the adapter of the first application in the first format, translate and/or parse the received message data into at least the second format; and output the translated and/or parsed message data to at least the second application.

In a further embodiment, a software module, stored on a computer-readable medium, for bridging messages between a first and at least a second application having differing message formats, comprises instructions for receiving message data from the adapter of the first application in a first format; instructions for translating and/or parsing the received message data into at least a second format; and instructions for outputting the translated and/or parsed message data to at least the second application.

In yet another embodiment, a message bridging apparatus comprises storage means for storing computer-readable instructions; instructions, stored in the storage means, for receiving message data from a first application in a first format, the first application having an adapter; instructions, stored in the storage means, for translating and/or parsing received message data into at least a second format; and instructions, stored in the storage means, for outputting the translated and/or parsed message data to at least a second application.

BRIEF DESCRIPTION OF THE DRAWINGS

FIG. 4 illustrates an exemplary event source message format, in one embodiment of the present invention;

FIG. 6 is a table illustrating an exemplary rule-based correspondence between the event source and event receiver message formats illustrated in FIGS. 4 and 5, in one embodiment of the present invention.

DETAILED DESCRIPTION OF THE EMBODIMENTS

Figure 1:
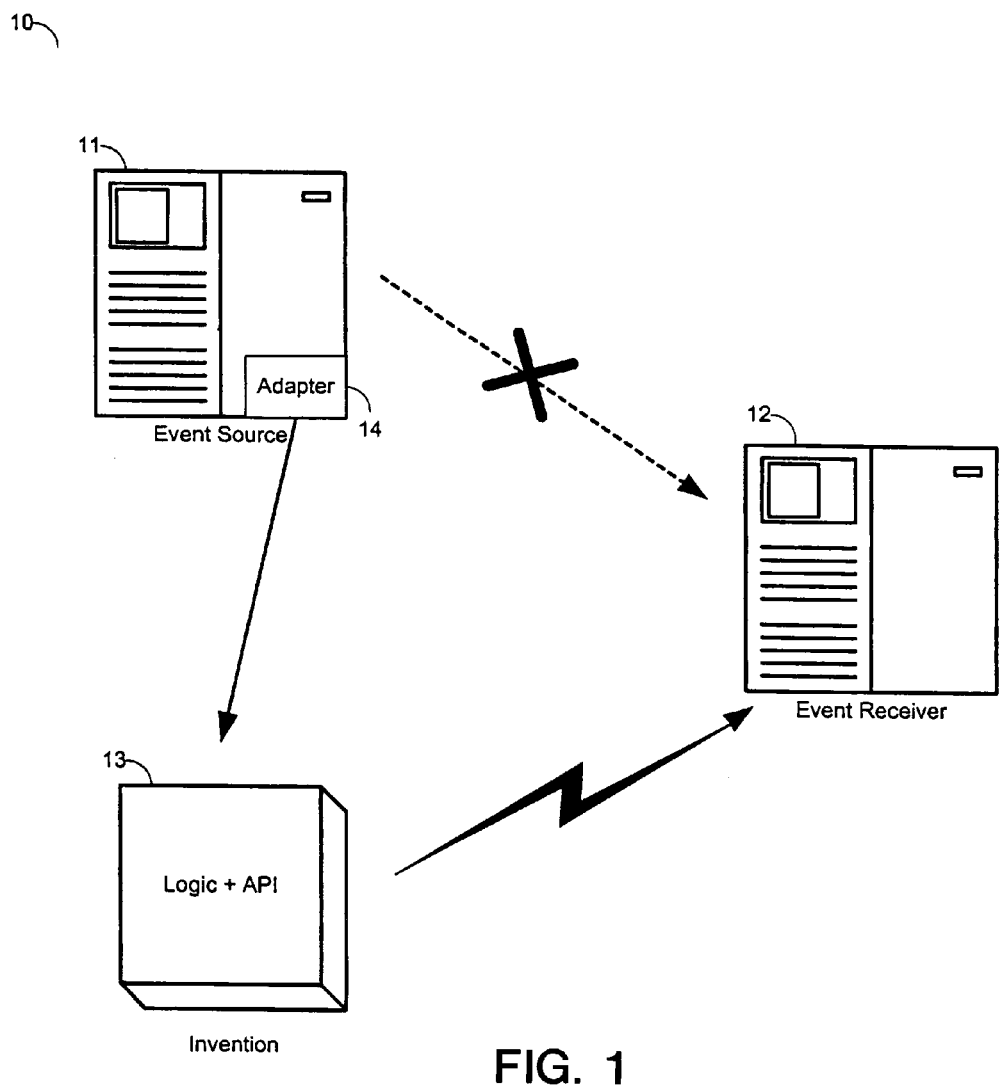
FIG. 1 is a system diagram of an exemplary enterprise in one embodiment of the present invention.

One embodiment of the invention is illustrated in FIG. 1, wherein an exemplary enterprise 10 has an event source 11 (e.g., a TSM server) having an adapter 14, an event receiver 12 (e.g. a T/EC server), and a message bridge module 13. The event source 11 is unable to send event messages directly to the event receiver 12 due to incompatible event formats. However, the event source 11 can instead, via its adapter 14, pass the message structure to the message bridge module 13, which translates it appropriately and passes it along to the event receiver 12 in an appropriate format.

The message bridge module 13 is dynamically loaded into the event source 11, thereby providing a point of integration into another mature software product. The message bridge module 13 operates by employing an adapter 14, e.g., a generic adapter, or a userexit of the event source 11. In this context, an "adapter" or "userexit" (also referred to as an "interface adapter") refers to a mechanism for extending the functionality of an application by means of an external program that may be written in any language and that provides additional control over features, e.g., formatting, processing, and selection of data, beyond that available from the application alone. A userexit is typically coded into software by specifying input and output formats for a function routine. A pointer to the userexit routine is then set by making an operating system call to load the userexit module into the main application's memory/workspace. A userexit is a function for the main application that is resolved at the execution of the application, not at the compilation of the application. Typically, the event source application outputs data to the userexit without receiving any confirmation regarding whether it was received. Those skilled in the art will recognize that a generic or other adapter may be used instead of a userexit. The message bridge module generally resides on the same server as the event source, occupying the same memory space from which the event source application is running. Thus, in effect, the message bridge module becomes a part of the event source application by virtue of its location at the userexit. It is noted that documentation, either external or internal, of the structures and elements of the source application may be needed in creating the message bridge module, depending on the manner in which the userexit is exposed.

Exemplary qualified event sources may include, without limitation, TSM, DB2, Oracle, SQL applications, PeopleSoft, knowledge management tools, databases, backup archive products, database servers, email servers, web servers, large applications used in an enterprise environment, applications that have their own message generation events, e.g., to signal attention to an administrator monitoring the application, and applications employing a userexit. Event receivers may include, without limitation, T/EC, DB2, Oracle, SQL applications, PeopleSoft, knowledge management tools, databases, backup archive products, database servers, email servers, web servers, large applications used in an enterprise environment, enterprise management applications, event monitoring applications, and applications adapted to receive messages from other applications that have their own message generation events. Event monitoring applications may include an application adapted for the sole function of event monitoring or reception, as well as an application that has event monitoring or receiving functions merely as one or more components of the application.

Figure 2:
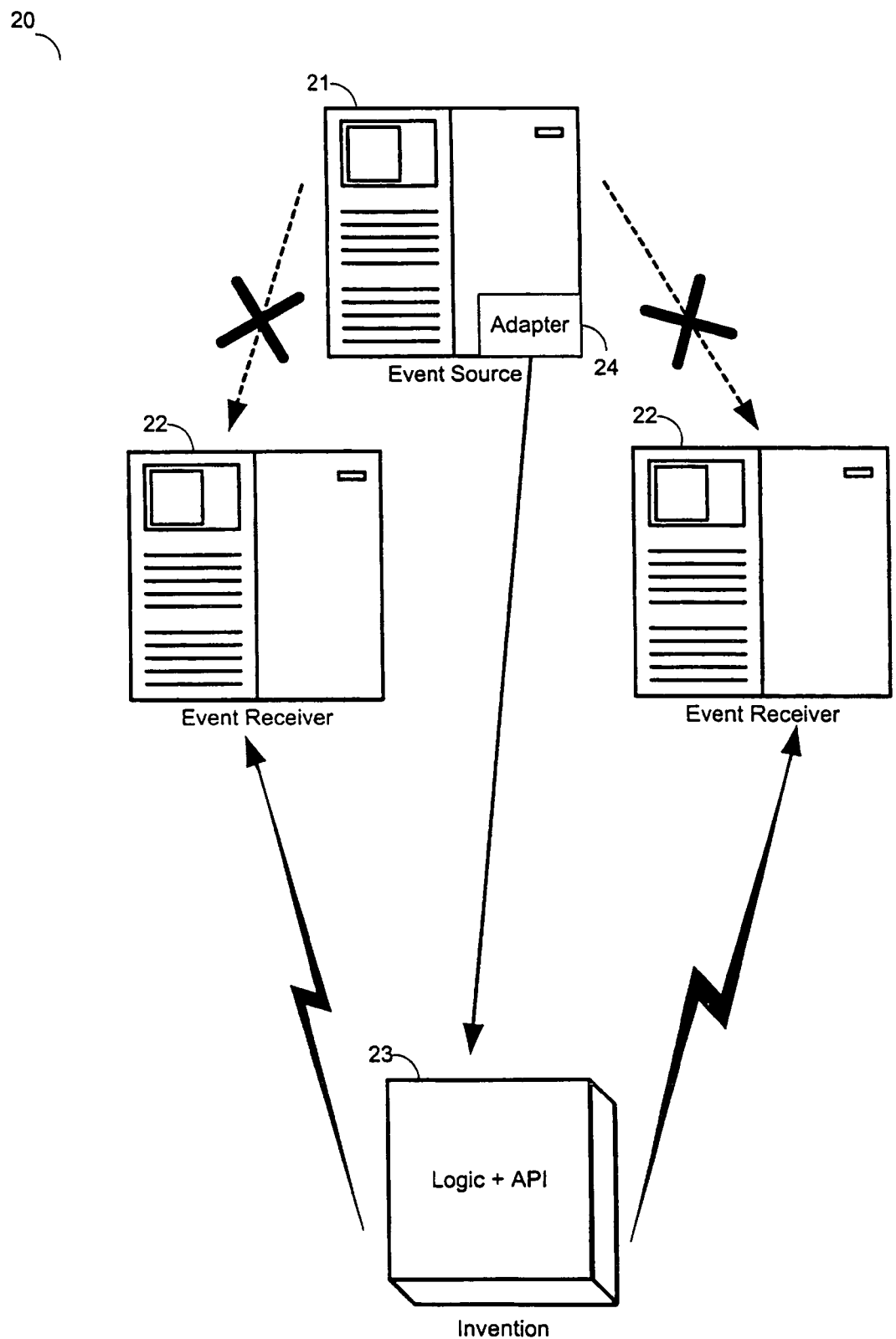
FIG. 2 is a system diagram of another exemplary enterprise in one embodiment of the present invention.

Another embodiment of the invention is illustrated in FIG. 2, wherein an exemplary enterprise 20 has an event source 21 (e.g., a TSM server) having an adapter 24, a plurality of event receivers 22 (e.g. a T/EC server), and a message bridge module 23. In this scenario, the event source 21 may be integrated with multiple APIs and may send messages to multiple event receivers 22 expecting messages in different formats. The event source 21 is unable to send event messages directly to the event receivers 22 due to incompatible event formats. However, the event source 21 can instead, via its adapter 24, pass the message structure to the message bridge module 23, which parses it using appropriate logic, translates it appropriately, and passes it along to one or more of the event receivers 22 in the appropriate formats.

Figure 3:
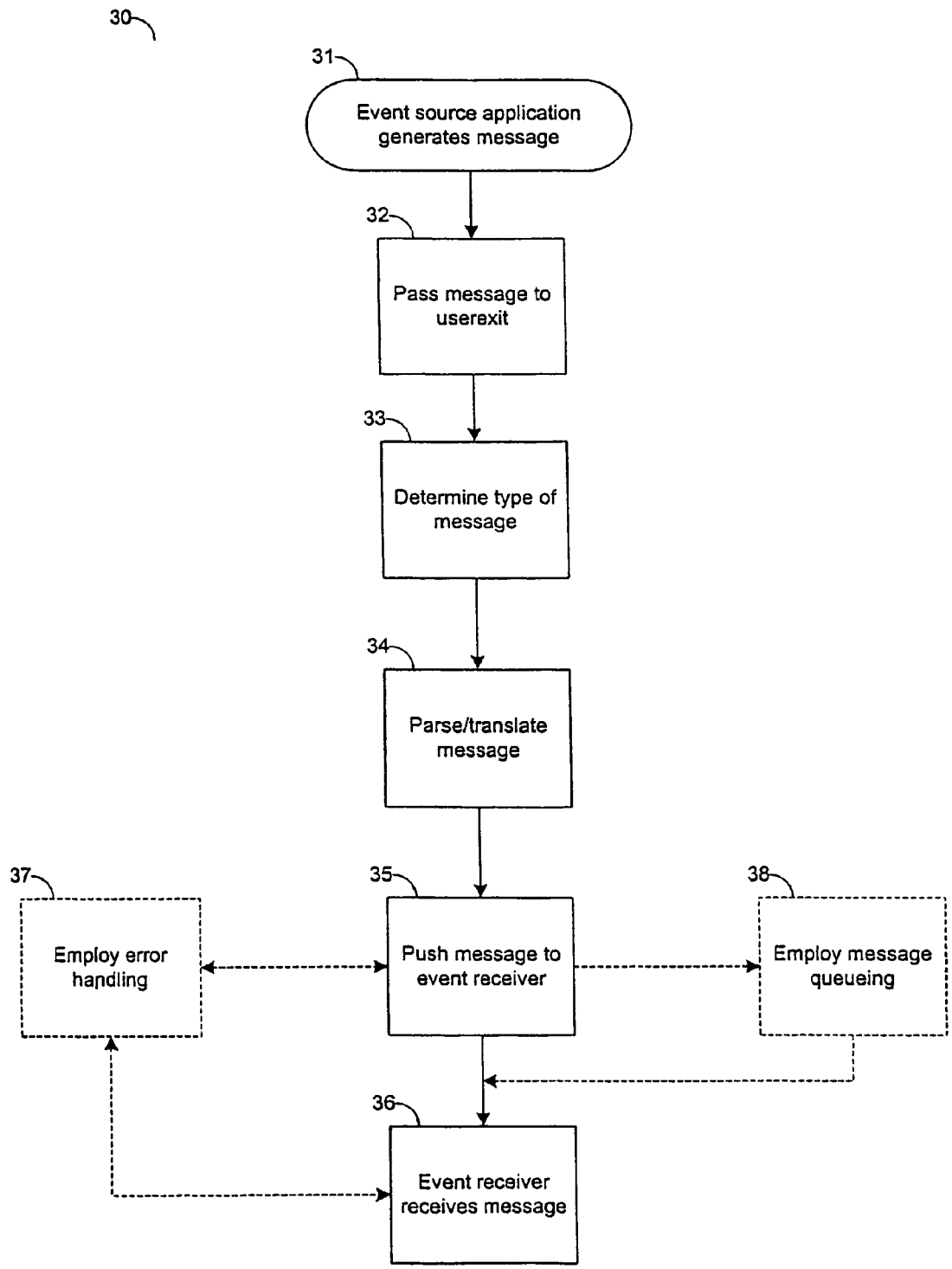
FIG. 3 is a flow diagram of the message bridging process in one embodiment of the present invention.

An exemplary operation process flow 30 of the invention is illustrated in FIG. 3. First, the event source application generates 31 a message, e.g., out of disk space, backup completed, database error. The message is then passed 32 to the userexit. Next, the type of message received from the application is determined 33. For example, TSM outputs five general classes of messages: local server events; events that are forwarded to the local server from another server; local client events (i.e., event messages received from clients strung off the server, which passes them off to an event monitor, e.g., T/EC); events from clients attached to a remote server (which then sends the message to the local server); and control events (e.g. "shutdown" or other such commands). The message is subsequently parsed and/or translated 34 using a set of rules appropriate to the application. One exemplary rule might be to ignore certain messages from the event source that have no counterpart in the event receiver. Another exemplary rule might be to convert an event message control data into a data structure adapted for receipt by the event receiver or event monitor, e.g. a set of Boolean values for an event monitor that accepts messages having only Boolean values, or a string to be received by a T/EC. A further exemplary ruleset might permit a T/EC to demand data not supplied by the TSM, wherein the ruleset supplies a reasonable substitute and returns it to the T/EC in a format expected by the T/EC. After the parsing and/or translation, the parsed and/or translated message is pushed 35 to the event receiver, which receives 36 the message in its expected format and acts accordingly. Depending on the application programming interface (API) of the event receiver, further additional steps in the aforementioned process might include, e.g., error handling cases for message transmission 37 or advanced features, such as message queuing 38.

By the aforementioned process, the power of the event receiver API may be utilized without requiring extensive coding effort in creating the application. Thus, two or more products may be developed simultaneously and independently, and the aforementioned process may be used to integrate the two by means of a message bridge module residing in the userexit of the event source application, without requiring code modification of the existing products.

Figure 5:
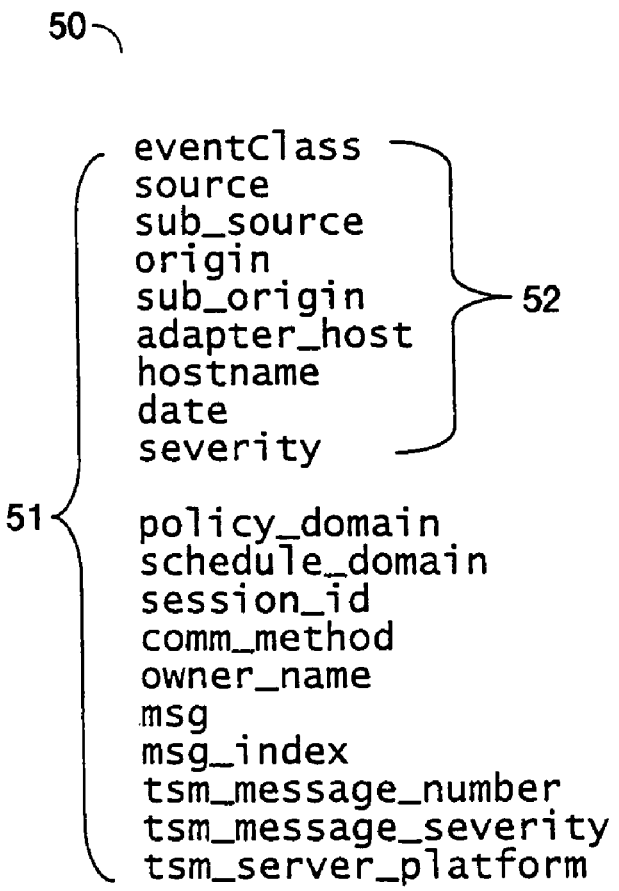
FIG. 5 illustrates an exemplary event receiver message format, in one embodiment of the present invention.

FIGS. 4 and 5 illustrate an exemplary event source message format 40 and event receiver message format 50, respectively, in one embodiment of the invention. In the example shown, the message formats correspond to those of TSM and T/EC, respectively. The principal difference between the message formats of TSM and T/EC is that TSM employs data structures 41, whereas the TEC expects and eventually parses, upon receipt, a semi-colon delimited string containing a number of fields 51, with several required fields 52, including eventClass, source, sub_source, origin, sub_origin, adapter_host, hostname, date, and severity.

Referring now to FIG. 6, in conjunction with the message formats 40, 50 illustrated in FIGS. 4 and 5, a table 60 illustrates an exemplary rule-based correspondence between the TSM and T/EC message formats. Table 60 includes columns for the data provided by TSM 61, data expected by T/EC 62, appropriate substitutions 63, and notes 64 regarding some of the variances between TSM and T/EC message formats. The message bridge module 23 contains appropriate instructions for receiving data in a first format, e.g. TSM data 61, translating the data received, and outputting data in a second format, e.g., T/EC data 62.

As those skilled in the art will recognize, the present invention may be embodied in a variety of systems, methods, and/or computer program software embodiments. Accordingly, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but is not limited to, an electronic, magnetic, optical, electromagnetic, infrared, or semiconductor system, apparatus, device, or propagation medium. More specific examples of the computer-readable medium include, without limitation, a magnetic, optical, or other fixed or removable computer disk, a random access memory (RAM), a read-only memory (ROM), an erasable programmable read-only memory (EPROM or Flash memory), and a portable compact disc read-only memory (CD-ROM). It is noted that the computer-usable or computer-readable memory could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Those skilled in the art should recognize that an integrated circuit (IC) chip or other such hardware device could be implemented to perform a translation algorithm consistent with the invention, e.g., using logic gates. It should further be recognized by those skilled in the art that such an IC chip could be fixedly or removably attached to, or integrated with, a printed circuit (PC) board, which could then be installed in a computer system. In this scenario, the userexit within the event source application would be loaded with an address for the module performing the translation, such that the algorithm could be implemented in either hardware or software, depending on real-time processing requirements and cost considerations.

It will be appreciated by those skilled in the art that although the functional components of the exemplary embodiments of the system of the present invention described herein may be embodied as one or more distributed computer program processes, data structures, dictionaries and/or other stored data on one or more conventional general purpose computers (e.g. IBM-compatible, Apple Macintosh, and/or RISC microprocessor-based computers), mainframes, minicomputers, conventional telecommunications (e.g. modem, DSL, satellite and/or ISDN communications), memory storage means (e.g. RAM, ROM) and storage devices (e.g. computer-readable memory, disk array, direct access storage) networked together by conventional network hardware and software (e.g. LAN/WAN network backbone systems and/or Internet), other types of computers and network resources may be used without departing from the present invention.

One or more networks discussed herein may be a local area network, wide area network, internet, intranet, extranet, proprietary network, virtual private network, a TCP/IP-based network, a wireless network, an e-mail based network of e-mail transmitters and receivers, a modem-based telephonic network, an interactive telephonic network accessible to users by telephone, or a combination of one or more of the foregoing.

The invention as described herein may be embodied in a computer residing on a server or server system, and input/output access to the invention may comprise appropriate hardware and software to allow supervised or unattended execution of various operations of the invention, in real-time and/or batch-type transactions. Additionally, those skilled in the art will recognize that the various components of the present invention may be remote from one another, and may further comprise appropriate communications hardware/software and/or LAN/WAN hardware and/or software to accomplish the functionality herein described.

Each of the functional components of the present invention may be embodied as one or more distributed computer program processes running on one or more conventional general purpose computers networked together by conventional networking hardware and software. Each of these functional components may be embodied by running distributed computer program processes (e.g., generated using "full-scale" relational database engines such as IBM DB2™, Microsoft SQL Server™, Sybase SQL Server™, Oracle 7.3™, or Oracle 8.0™ database managers, and/or a JDBC interface to link to such databases) on networked computer systems (e.g. comprising mainframe and/or symmetrically or massively parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. Primary elements of the invention may be server-based and may reside on hardware supporting an operating system such as Microsoft Windows NT/2000™ or UNIX.

Alternatively, the aforesaid functional components may be embodied by a plurality of separate computer processes (e.g. generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to the present invention. These personal computers may run the Unix, Microsoft Windows NT/2000™ or Windows 95/98/ME/XP™ operating systems. The aforesaid functional components of a system according to the present invention may also comprise a combination of the above two configurations (e.g. by computer program processes running on a combination of personal computers, RISC systems, mainframes, symmetric or parallel computer systems, and/or other appropriate hardware and software, networked together via appropriate wide- and local-area network hardware and software).

In one embodiment, source code may be written in an object-oriented programming language using relational databases. Such an embodiment may include the use of programming languages such as C++. Other programming languages which may be used in constructing a system according to the present invention include Java, HTML, Perl, UNIX shell scripting, assembly language, Fortran, Pascal, Visual Basic, and QuickBasic. Those skilled in the art will recognize that the present invention may be implemented in hardware, software, or a combination of hardware and software. It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

What is claimed is:

1. A method for bridging messages between a first and at least a second application having differing message formats, said method comprising:
   dynamically loading a message bridge module into said first application;
   operating said message bridge module by employing userexit routine;
   setting a pointer to said userexit routine by making an operating system call to load a userexit module into said first application's memory and workspace;
   resolving said userexit routine at the execution of said first application, not at the compilation of said first application;
   said first application outputting data to said userexit module without receiving any confirmation regarding whether said data was received;
   said bridge module receiving message data from said userexit module of said first application in a first format;
   said bridge module translating and/or parsing said received message data into at least a second format; and
   said bridge module outputting said translated and/or parsed message data to at least said second application.

2. A method as claimed in claim 1, wherein said message data is event data.

3. A method as claimed in claim 1, wherein said translating and/or parsing is performed by instructions residing on the same server as said first application.

4. A method as claimed in claim 1, further comprising handling errors for messages outputted to at least said second application.

5. A method as claimed in claim 1, further comprising queuing messages outputted to at least said second application.

6. A method as claimed in claim 1, further comprising determining the message type of the message data received.

7. A computer system comprising:
a first application having an adapter capable of outputting message data in a first format, wherein said first application resides on a server;
at least a second application capable of receiving message data in a second format;
a message bridge module dynamically loaded into said first application, said message bridge module a operating by employing a userexit routine and adapted to receive message data from the adapter of said first application in said first format;
said first application adapted for;
setting a pointer to said userexit routine by making an operating system call to load a userexit module into said first application's memory and workspace;
resolving said userexit routine at the execution of said first application, not at the compilation of said first application;
outputting data to said userexit module without receiving any confirmation regarding whether said data was received;
said message bridge module further adapted to translate and/or parse said received message data into at least said second format and output said translated and/or parsed message data to at least said second application.

8. A computer system as claimed in claim 7, wherein said message bridge module resides on the same server as said first application.

9. A computer system as claimed in claim 7, wherein said message data is event data.

10. A computer system as claimed in claim 7, further comprising an error handler for messages outputted to at least said second application.

11. A computer system as claimed in claim 7, further comprising a message queue for messages outputted to at least said second application.

12. A computer system as claimed in claim 7, wherein said adapter is a generic adapter or a userexit.

13. A software module, stored on a tangible computer-readable medium, for bridging messages between a first and at least a second application having differing message formats, wherein said computer-readable medium includes one of a magnetic, optical, or other fixed or removal computer disk, a random access memory, a read-only memory, an erasable programmable read-only memory, and a portable compact disc read-only memory, said module comprising:
instructions for dynamically loading a message bridge module into said first application;
instructions for operating said message bridge module by employing a userexit routine;
instructions for setting a pointer to said userexit routine by making an operating system call to load a userexit module into said first application's memory and workspace;
instructions for resolving said userexit routine at the execution of said first application, not at the compilation of said first application;
instructions for said first application outputting data to said userexit module without receiving any confirmation regarding whether said data was received;
instructions for said bridge module receiving message data from said userexit module of said first application in a first format;
instructions for said bridge module translating and/or parsing said received message data into at least a second format; and
instructions for said bridge module outputting said translated and/or parsed message data to at least said second application.

14. A software module as claimed in claim 13, wherein said message data is event data.

15. A software module as claimed in claim 13, further comprising instructions for handling errors for messages outputted to at least said second application.

16. A software module as claimed in claim 13, further comprising instructions for queuing messages outputted to at least said second application.

17. A software module as claimed in claim 13, further comprising instructions for determining the message type of the message data received.

18. A message bridging apparatus comprising:
storage means for storing computer-readable instructions;
instructions, stored in said storage means for dynamically loading a message bridge module into said first application;
instructions, stored in said storage means for operating said message bridge module by employing a userexit routine;
instructions, stored in said storage means for setting a pointer to said userexit routine by making an operating system call to load a userexit module into said first application's memory and workspace;
instructions, stored in said storage means for resolving said userexit routine at the execution of said first application, not at the compilation of said first application;
instructions, stored in said storage means for said first application outputting data to said userexit module without receiving any confirmation regarding whether said data was received;
instructions, stored in said storage means for said bridge module receiving message data from said userexit module of said first application in a first format;
instructions stored in said storage means for said bridge module translating and/or parsing said received message data into at least a second format; and
instructions, stored in said storage means for said bridge module outputting said translated and/or parsed message data to at least said second application.

19. A message bridging apparatus as claimed in claim 18, wherein said message data is event data.

20. A message bridging apparatus as claimed in claim 18, further comprising instructions for handling errors for messages outputted to at least said second application.

21. A message bridging apparatus as claimed in claim 18, further comprising instructions for queuing messages outputted to at least said second application.

22. A message bridging apparatus as claimed in claim 18, further comprising instructions for determining the message type of the message data received.

* * * * *